(12) United States Patent
Chauvel

(10) Patent No.: US 7,295,576 B2
(45) Date of Patent: Nov. 13, 2007

(54) TRANSPORT PACKET PARSER

(75) Inventor: Gerard Chauvel, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 782 days.

(21) Appl. No.: 10/404,854

(22) Filed: Apr. 1, 2003

(65) Prior Publication Data

US 2004/0017821 A1    Jan. 29, 2004

Related U.S. Application Data

(62) Division of application No. 09/348,103, filed on Jul. 6, 1999, now Pat. No. 6,621,817.

(51) Int. Cl.
*H04J 3/24*   (2006.01)
*H04N 7/167*  (2006.01)

(52) U.S. Cl. ..................................... 370/474
(58) Field of Classification Search ............... 370/474, 370/389–395, 465, 442, 347, 310, 394, 398, 370/401, 428, 487, 498, 469, 503, 341; 348/726, 348/425, 461, 714, 465, 423.1, 558, 467; 380/210, 212, 203, 239, 216; 375/240.28, 375/240.12, 240.26
See application file for complete search history.

(56) References Cited

U.S. PATENT DOCUMENTS

| | | | |
|---|---|---|---|
| 4,962,427 A | 10/1990 | Lunn et al. | |
| 5,182,799 A | 1/1993 | Tamura et al. | |
| 5,307,343 A | 4/1994 | Bostica et al. | |
| 5,668,601 A | 9/1997 | Okada et al. | |
| 5,686,965 A | 11/1997 | Auld | |
| 5,689,509 A | 11/1997 | Gaytan et al. | |
| 5,712,853 A | 1/1998 | Mathur et al. | |
| 5,742,361 A | 4/1998 | Nakase et al. | |

(Continued)

FOREIGN PATENT DOCUMENTS

EP    0 679 028 A    10/1995

(Continued)

OTHER PUBLICATIONS

"Implementation of MPEG Transport Demultiplexer With a RISC-Based Microcontroller", Fujii, et al., IEEE Transactions on Consumer Electronics, U.S., IEEE Inc., NY, vol. 42, No. 3, Aug. 1, 1996, pp. 431-438.

*Primary Examiner*—Wing Chan
*Assistant Examiner*—Prenell Jones
(74) *Attorney, Agent, or Firm*—Dolly Y. Wu; W. James Brady; Frederick J. Telecky, Jr.

(57) ABSTRACT

A transport packet parser (42) includes a transport packet header decoder (50) for identifying a packet identifier (PID) and continuity counter (CC) associated with a current packet. The PID along with an enable (En) bit is input to an PID associative memory (52) in search mode to identify an address associated with the PID. The address is used to access a CC associated with a previous packet for the same PID in a random access memory (62). The previous continuity counter is used along with other header information to determine whether the current packet satisfies predetermined criteria. If so, the packet is passed to a transport packet buffer for further processing.

9 Claims, 4 Drawing Sheets

U.S. PATENT DOCUMENTS

| | | |
|---|---|---|
| 5,745,488 A | 4/1998 | Thompson et al. |
| 5,781,549 A | 7/1998 | Dai |
| 5,784,277 A | 7/1998 | Meyer |
| 5,796,743 A | 8/1998 | Bunting et al. |
| 5,802,063 A | 9/1998 | Deiss |
| 5,838,265 A | 11/1998 | Adolph |
| 5,839,100 A | 11/1998 | Wegener |
| 5,898,695 A | 4/1999 | Fujii et al. |
| 5,960,006 A | 9/1999 | Maturi et al. |
| 5,966,385 A | 10/1999 | Fujii et al. |
| 6,229,801 B1 | 5/2001 | Anderson et al. |
| 6,272,615 B1 | 8/2001 | Li et al. |
| 6,369,855 B1 | 4/2002 | Chauvel et al. |
| 6,414,726 B1 | 7/2002 | Chauvel |
| 7,023,992 B1 * | 4/2006 | Kubota et al. ............ 380/210 |

FOREIGN PATENT DOCUMENTS

| | | |
|---|---|---|
| EP | 0 735 776 A | 10/1996 |
| EP | 0 840 520 A2 | 5/1998 |

* cited by examiner

TRANSPORT PACKET PARSER

CROSS-REFERENCE TO RELATED APPLICATIONS

This is a divisional application of Ser. No. 09/348,103, filed Jul. 6, 1999 now U.S. Pat. No. 6,621,817.

STATEMENT OF FEDERALLY SPONSORED RESEARCH OR DEVELOPMENT

Not Applicable

BACKGROUND OF THE INVENTION

1. Technical Field

This invention relates in general to digital communications and, more particularly, to a transport packet parser.

2. Description of the Related Art

Over the last few years, digital transmission has become a significant technology in communicating audio and video information. Digital transmission is used in digital satellite systems, high definition television (HDTV), and in DVD (digital versatile disks) to carry audio and video information.

The MPEG-2 (Motion Picture Experts Group) protocol is the most common protocol used in digital audio/video transmission. MPEG-2 compresses video information and provides the transport protocol for communicating the compressed information.

FIG. 1 illustrates a simplified diagram showing the formation of an MPEG-2 transport stream. Audio information is encoded in by audio encoder 10 and video information is encoded by video encoder 12. The output of the audio encoder 10 is digitized audio information and the output of video encoder 12 is digitized video information. The audio encoder 10 and video encoder 12 may compress and modify the information.

The outputs of the audio and video encoders 10 and 12 are coupled to packetizers 14 and 16 which arrange digitized audio and video information into packets for transmission. The audio and video packets may be combined with packets containing data and PSI (Program Specific Information) to form the transport stream. The PSI includes data transmitted for use by the demultiplexer in the receiver. The transport stream may by modulated for transmission via satellites or by local television digital broadcast.

Packets 18 in the transport stream are shown in FIG. 2. Each packet includes a header 20 and a payload 22. For MPEG-2, the header is a 32-bit field and the payload is a 184-byte field.

The packet header 20 is shown in greater detail in FIG. 3. The header 20 comprises a number of fields: an 8-bit sync field 24, a 1-bit transport error field 26, a 1-bit payload unit star indicator field 28, a 1-bit transport priority field 30, a 13-bit PID (packet identifier) field 32, a 2-bit transport scrambling control field 34, a 2-bit adaptation field control field 36 and a 4-bit continuity counter (CC) field 38. Of particular interest is the PID, which is used to identify packets associated with a common stream (i.e., an audio stream or a video stream) and the CC which identifies a position for the packet within the stream identified by the PID.

The transport stream is decoded by a transport demultiplexer (after demodulation, if necessary). The MPEG-2 transport demultiplexer receives the MPEG transport stream and separates the video, audio and services information packets. After decoding, the audio and video packets are placed in respective memory buffers to form a data stream. An audio decoder decodes the MPEG audio stream and produces an analog audio signal. The video decoder decodes the MPEG video stream and produces the video picture.

A key aspect of demultiplexing the transport stream is identifying which stream a packet is associated with. Packets in a common stream share a PID. The continuity counter (CC) identifies the proper position of the packet in a stream. A CC value which is the same as the previous packet of the same PID indicates a duplication or an adaptation field. A CC value which is equal to the previous CC+1 indicates a new packet. Other values may indicate an error in the communication or an allowed discontinuity.

In demultiplexing the transport stream, most systems use a sequential approach to compare the received PID successively with 32 values stored in a PID table. However, due to the high data rate of the MPEG stream (up to 60 Mbits/s) this method requires high processing frequency and complex logic circuitry.

Therefore, a need has arisen for a high speed method and apparatus to search for PIDs in conjunction with a transport stream.

BRIEF SUMMARY OF THE INVENTION

The present invention provides a transport packet parser. A header decoder identifies a packet identifier and continuity counter for a current packet. An associative memory stores packet identifiers at respective addresses and has a search mode for comparing a current packet identifier and outputting a signal indicating the address at which the packet identifier is stored. A random access memory stores continuity counters associated with a previous packet for each packet identifier stored in the associative memory. Control circuitry coupled to the associative memory and the random access memory determines whether the current packet satisfies predetermined criteria.

The present invention provides significant advantages over the prior art. The use of an associative memory speeds the identification of packet identifiers, reducing latencies, logic complexity, and power dissipation associated with sequential approaches.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 4-7 of the drawings, like numerals being used for like elements of the various drawings.

Figure 1:
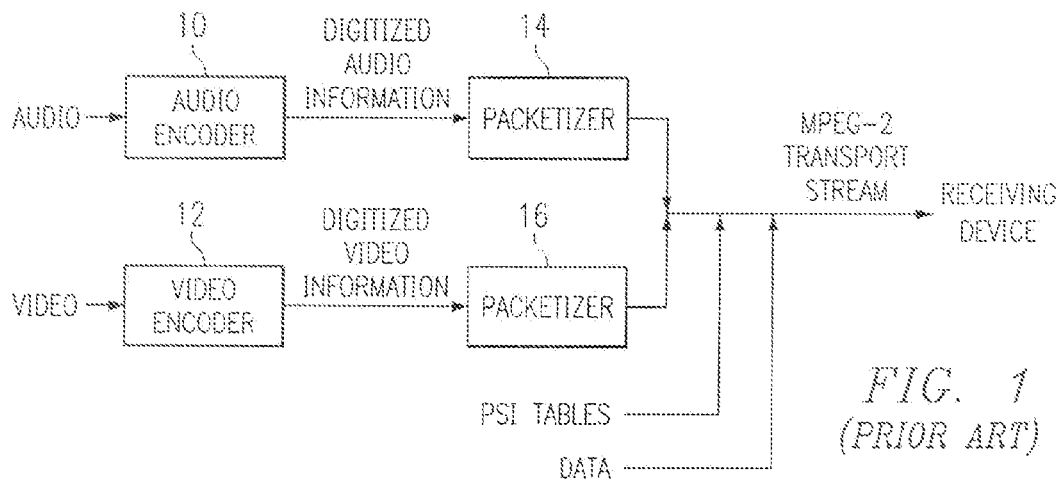
FIG. 1 illustrates a block diagram of a circuit for encoding an MPEG-2 transport stream.
Figure 2:
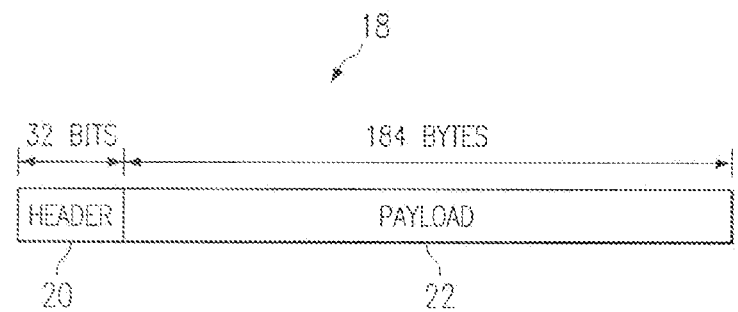
FIG. 2 illustrates a diagram of a packet in the MPEG-2 transport stream.
Figure 4:
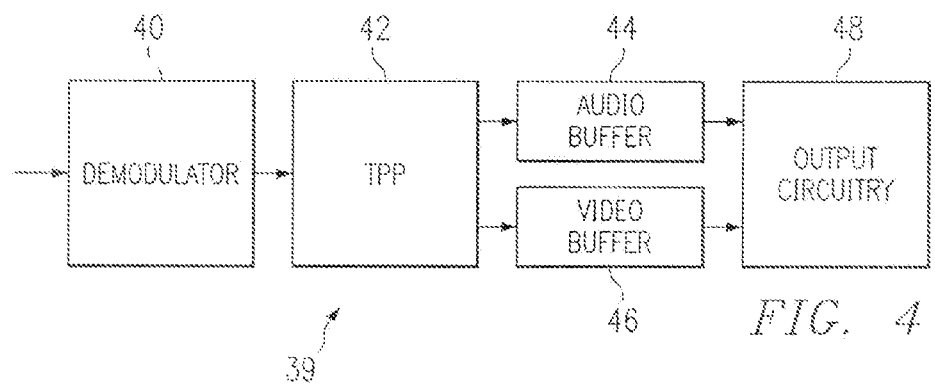
FIG. 4 illustrates a block diagram of an IRD.
Figure 3:
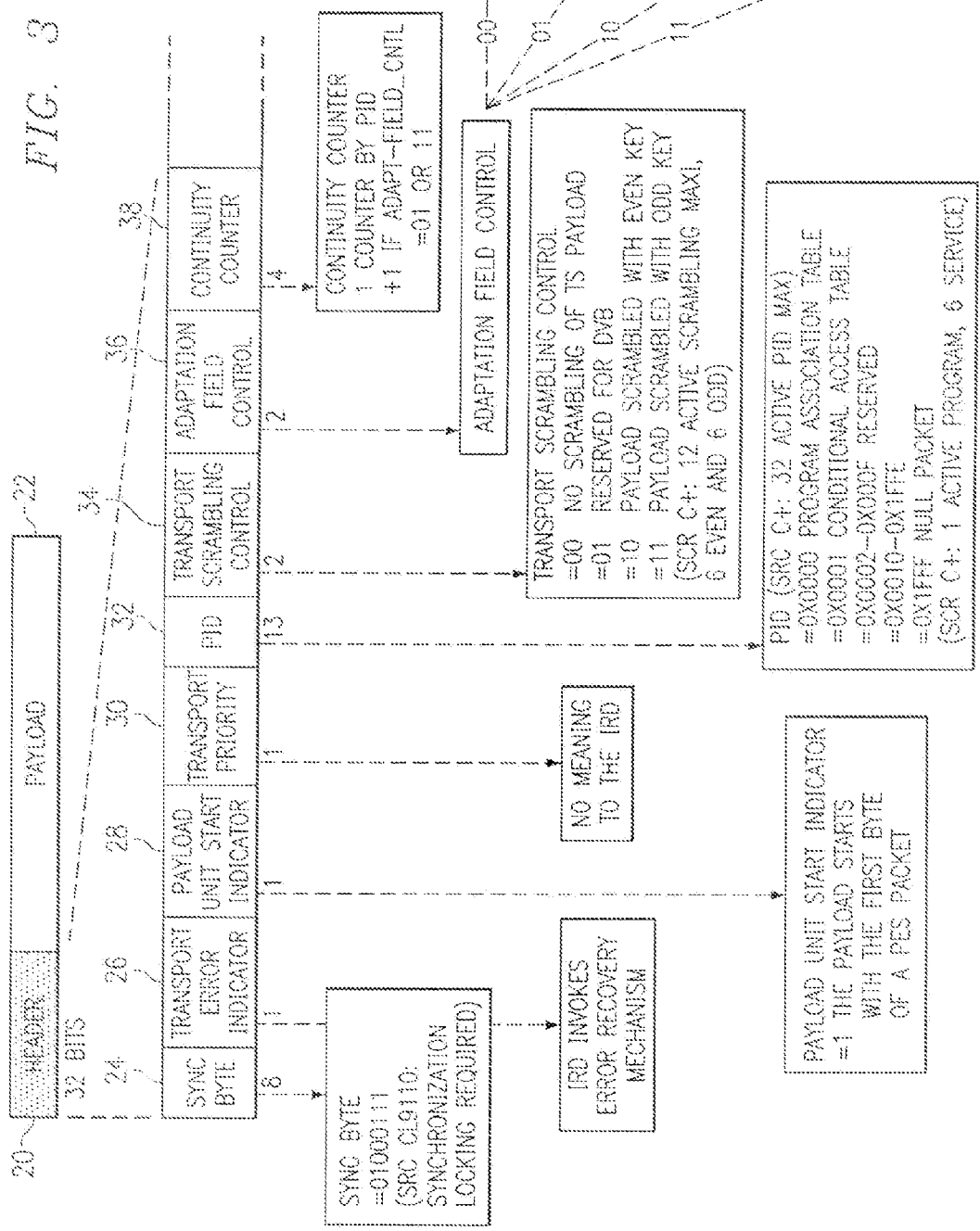
FIG. 3 illustrates diagram of the header portion of the packet of FIG. 2.

FIG. 4 illustrates an IRD (Integrated Receiver Demultiplexer) 39. A demodulator 40 receives the modulated signal from a satellite or other source. The output of the demodulator is the packetized transport stream (TS). The TS is received by the TPP (Transport Packet Parser) 42 which separates packets according to the PID value. The audio and video packets output from the TPP are stored in respective audio and video buffers 44 and 46 (which may be part of the same memory). The audio and video buffers are used by the output circuitry 48 to produce an audio/video signal, which can be directed to, for example, a television set or projector.

In operation, the IRD 39 may be of a conventional design, with the exception of the TPP 42 which is described in greater detail hereinbelow. In addition to its use in a IRD, the TPP 42 could be used in other devices, such as a DVD decoder.

Figure 5:
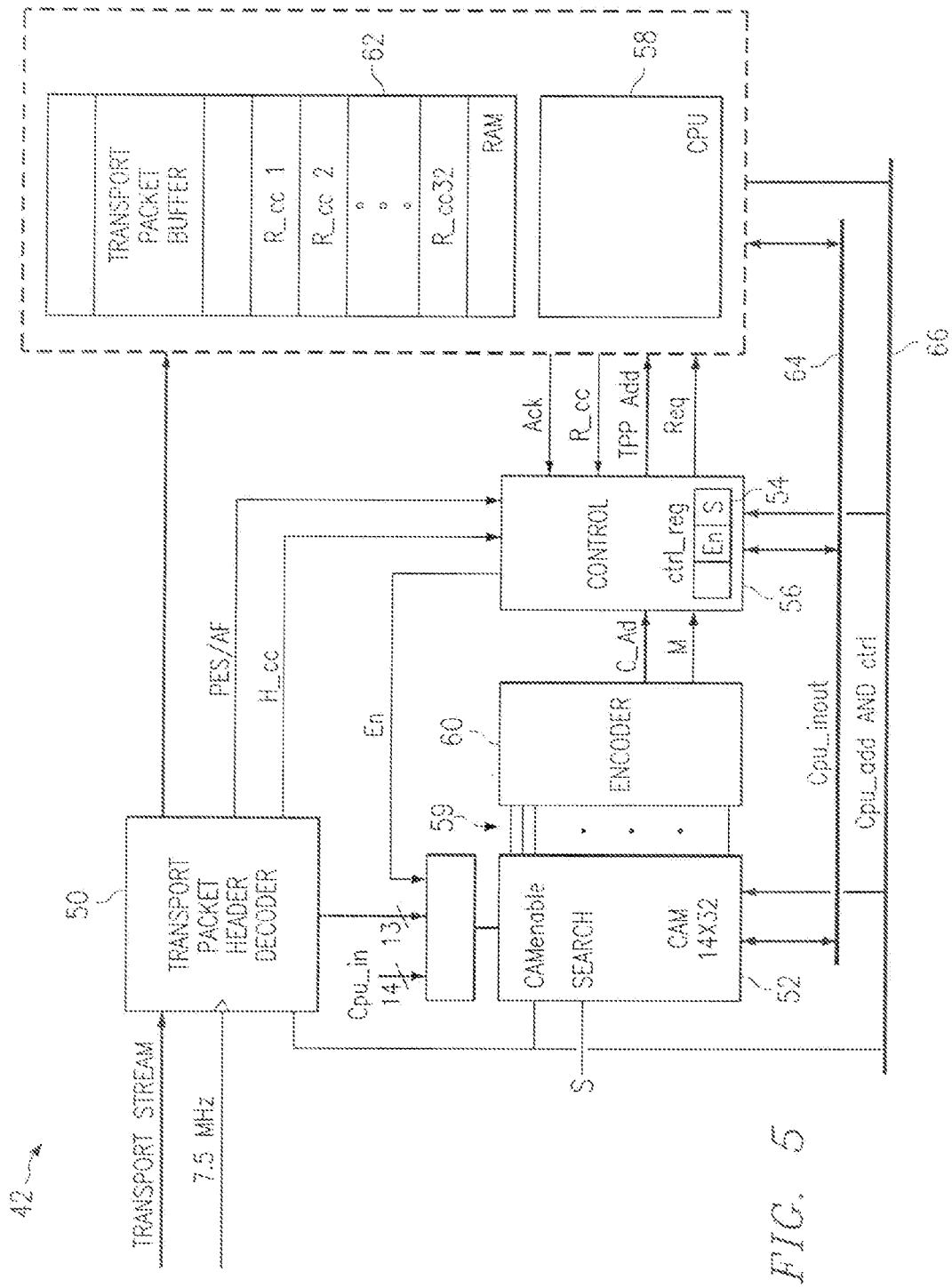
FIG. 5 illustrates a block diagram of a transport packet parser.

FIG. 5 illustrates a block diagram of the TPP 42. The transport stream is received by the transport packet header decoder 50, along with a 7.5 MHz clock signal. The transport packet header decoder 50 outputs a 13-bit header from a packet to a PID associative memory 52. The PID associative memory 52 also receives an enable (En) signal from control register 54 in control block 56. PID memory 52 receives a Search control signal and a CAM_enable control signal from CPU 58. In response to a PID input (the 13-bit PID concatenated with the En bit), the PID associative memory 52 enable one (or more) of thirty-two match lines 59, which are attached to encoder 60. Encoder 60 sends a corresponding address signal (C_Ad) and a match signal (M) to control block 56. RAM 62 stores the continuity counter values for the previous instance of each PID at addresses R_cc1 through R_cc32, which corresponds to the value of C_Ad. The transport packet header decoder 50 also sends a current value of the continuity counter (H_cc) and the payload unit start indicator and the adaptation field control bits (PES/AF) to control block 56. CPU 58 is coupled to control block 56 and PID associative memory 52 through CPU_inout bus 64 and to control input on the PID associative memory 52 and the transport packet header decoder 50 through CPU_add&ctrl bus 66.

In operation, the transport packet header decoder receives packets 18 from the transport stream. The TPP 42 uses the payload unit start indicator field 28, the 13-bit PID field 32, the 2-bit adaptation field control field 36 and the continuity counter field 38 to perform PID recognition. The payload start indicator is a flag which has normative meaning for transport stream packets that carry PES packets or PSI data. When the payload of the transport stream packets carry PES packet data, this flag is set to "1" when the payload of the packet starts with the first byte of a PES packet. The adaptation control bits indicate the presence of an adaptation field in the payload.

In the illustrated embodiment, PID associative memory 52 stores up to thirty-two PIDs (more or less could be used in a specific implementation). PID associative memory 52 uses an associative memory (also known as a content addressable memory or "CAM") to store the PIDs. When a packet is detected by the transport packet header decoder 50, the value in the PID value is concatenated with the En bit and presented to the data inputs of the PID associative memory. When the CAM_enable and Search control signals to the PID associative memory 52 are enabled, one of the thirty-two match lines 59 will transition to an active state if there is a match of the data presented to the PID associative memory 52 and a value stored in the PID associative memory 52. In the illustrated embodiment, search mode is enabled by setting the "S" bit in control register 54.

After a reset, all En bits in the PID associative memory 52 are set to "0". When the CPU 58 programs a PID value in the PID associative memory 52, the corresponding En bit is set to "1". To search for matching PIDs, the En bit in control register 54 is set to "1". Accordingly, only the PID values in the associative memory 52 having an En bit equal to "1" will be compared to the current PID when the PID associative memory 52 is in search mode. Values in the PID associative memory 52 with an En="0" will be ignored during the search.

Encoder 60 translates the ordinal of the active match line to a 5-bit address, C_Ad[4:0] and the Match signal (M) is enabled. If there is no match in the PID associative memory 52, then none of the match lines 59 will be enabled, and the Match signal will be disabled in response. If the Match signal is disabled, i.e., if the Match signal equals "0", the current packet is discarded.

If the Match signal is enabled, indicating a match in the PID associative memory 52, the continuity counter for the previous packet with the same PID value is retrieved from RAM 62. To do so, the control block 56 generates a request (Req) to the CPU 58 to read the previous continuity counter stored into the RAM 62 at TPP_add. TPP_add combines C_Ad, the payload unit indicator flag 28, and the adaptation field control bits 36. The RAM 62 returns the corresponding continuity counter through the R_cc bus. The control block processes the received (H_cc) and previous continuity counters (R_cc). If the received continuity counter satisfies the criteria given by the MPEG standard, the packet is transferred to the transport packet buffer in the RAM 62 for further processing by the CPU 58. The received continuity counter is stored at the same R_cc address in RAM 62.

Figure 6:
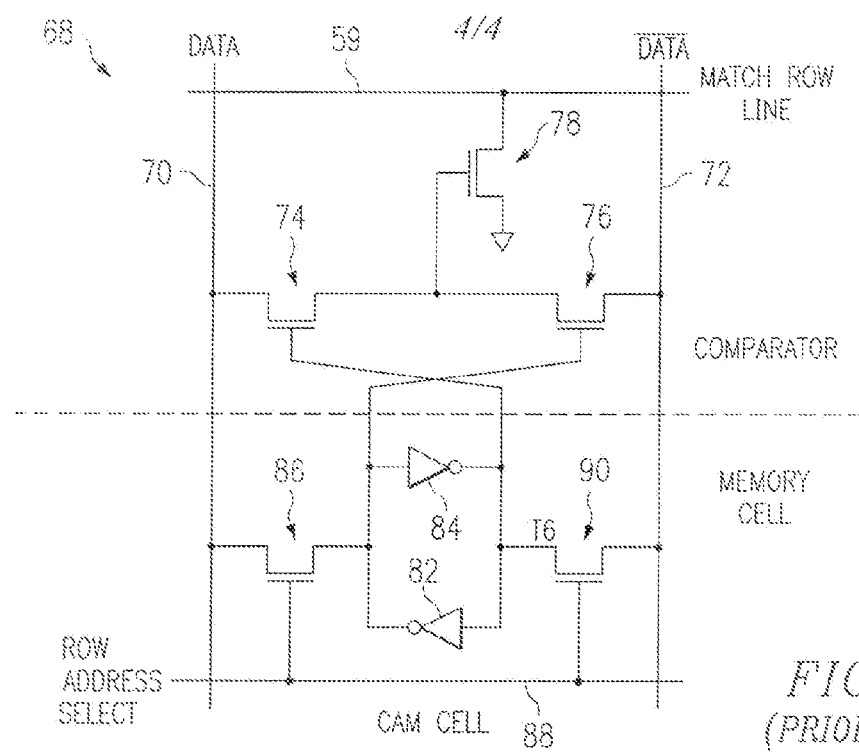
FIG. 6 illustrates a schematic representation of a CAM cell.
Figure 7:
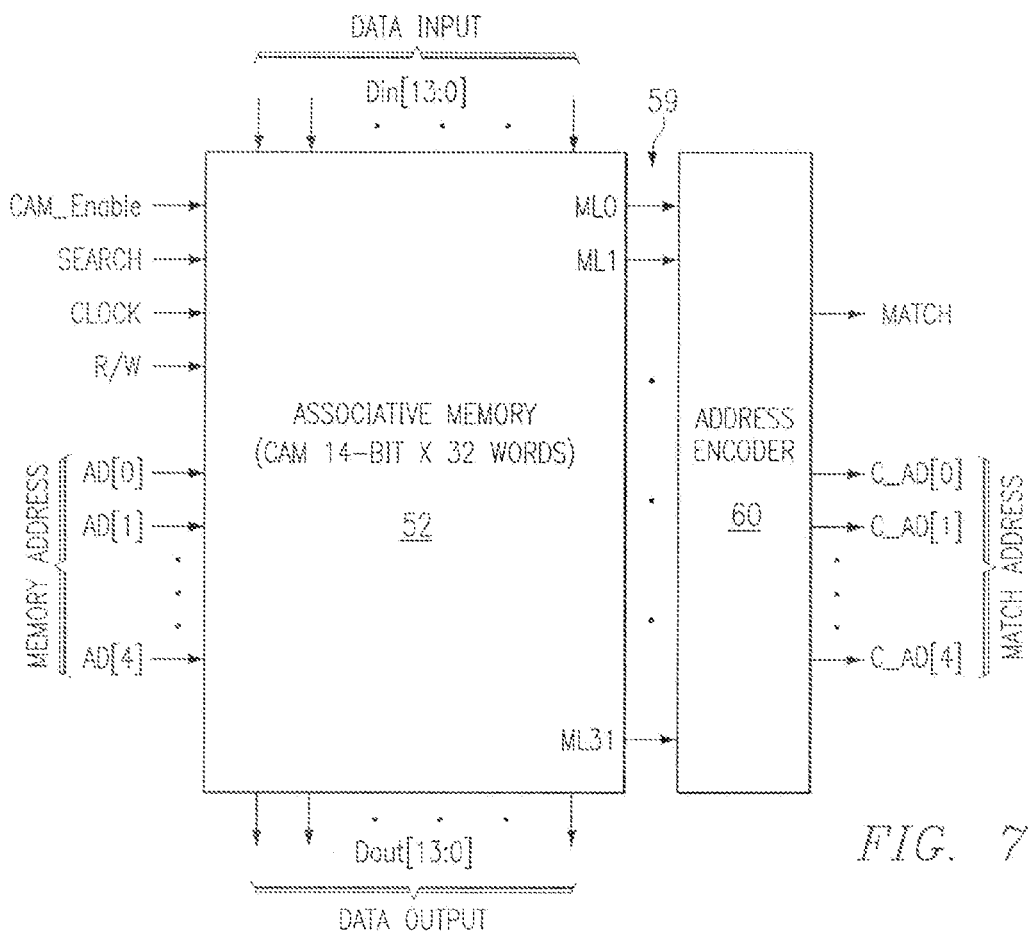
FIG. 7 illustrates a more detailed view of the signals received and sent by the PID associative memory of the transport packet parser of FIG. 5.

FIG. 6 illustrates a basic cell which can be used in the PID associative memory 52. FIG. 7 illustrates a more detailed view of the signals received and sent by the PID associative memory 52.

Referring to FIG. 6, a basic CAM cell 68 is shown. DATA line 70 and $\overline{\text{DATA}}$ line 72 are coupled to the first source/drains of n-channel transistors 74 and 76, respectively. The second source/drains of transistors 74 and 76 are coupled to the gate of n-channel transistor 78 and to each other. A first source/drain of transistor 78 is coupled to a Match Row line 80 and the other source/drain of transistor is coupled to the power rail. The gate of transistors 74 is coupled to the input of inverter 82 and the output of inverter 84. The gate of transistors 76 is coupled to the input of inverter 84 and the output of inverter 82. N-channel transistor 86 has a first source/drain coupled to the DATA line 70, a second source/drain coupled to the output of inverter 82, the input of inverter 84 and the gate of transistor 76, and a gate coupled to the Row Address Select line 88. N-channel transistor 90 has a first source/drain coupled to the $\overline{\text{DATA}}$ line 72, a second source/drain coupled to the input of inverter 82, the output of inverter 84 and the gate of transistor 74, and a gate coupled to the Row Address Select line 88.

FIG. 7 illustrates the data and control signals for the PID associative memory 52. The PID associative memory 52 has fourteen data inputs Din[13:0] and fourteen data outputs Dout[13:0]. For a 32-word cell, the PID associative memory 52 has thirty two match lines 59, which are input to encoder 60, which outputs a 4-bit address, based on which match line is enabled, and a match signal (enabled if one of the thirty-two match lines 59 is enabled). Address lines AD[4:0] specify one of the thirty-two addresses to which data from the Din port can be written or read, based on the R/W signal. When the Search signal is enabled, the memory matches the data on the Din port and enables one of the match outputs if a match is found. The CAM_enable must be enabled whenever the PID associative memory 52 is read from, written to, or searched.

In operation, for a memory write, when CAM_enable is enabled, R/W is low (write mode) and Search is disabled, the memory address lines AD[4:0] select the corresponding Row Address Select line 88 and, during the clock signal, transistors 86 and 90 of the corresponding row of cells are open (i.e., in a low impedance state). Din[13:0] force the state of the selected inverters 82 and 84 to the state of the data lines 70 and 72.

For a memory read, CAM_enable is enabled, R/W is high and Search is disabled. The memory address lines AD[4:0] select the corresponding Row Address Select line 88. During the clock signal the transistors 86 and 90 of the corresponding row of cells are open. The data lines 70 and 72 force Dout[13:0] the values corresponding to the contents of the cells.

For a memory search, CAM_enable is enabled and search is enabled. Before the search, all match row lines ML[31:0] are precharged to a logical "1". During the clock. Din[13:0] is compared to all thirty-two memory words. All cells that match the corresponding input force transistor 78 to a high impedance state. Cells which do not match their respective Din input place transistor 78 in a low impedance state. If all of the transistors 78 of a single row are in a high impedance state, the corresponding Match Row line 59 is active. If multiple rows are active (i.e., the value at Din[13:0] was stored in multiple words), the address encoder 60 generates an address equal to the lowest match line number.

The present invention provides significant advantages over the prior art. The use of an associative memory speeds the identification of packet identifiers, reducing latencies, logic complexity, and power dissipation associated with sequential approaches.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

The invention claimed is:

1. An integrated receiver decoder comprising:
   a header decoder for identifying a packet identifier and continuity counter for a current packet;
   an associative memory for storing packet identifiers at respective addresses, said associative memory having a search mode for comparing a current packet identifier with stored packet identifiers and outputting a signal indicating the address at which the packet identifier is stored;
   a random access memory for storing continuity counters associated with a previous packet for each packet identifier stored in said associative memory; and
   control circuitry coupled to said associative memory and said random access memory for determining whether the current packet satisfies predetermined criteria;
   an audio buffer for storing audio packets which satisfy said predetermined criteria;
   a video buffer which satisfy said predetermined criteria; and
   output circuitry for generating an audio/video signal from the packets in said audio and video buffers.

2. The integrated receiver decoder of claim 1, wherein said associative memory stores an enable bit with each packet identifier.

3. The integrated receiver decoder of claim 1 wherein said random access memory includes a section for storing packets for which the predetermined criteria was satisfied.

4. The integrated receiver decoder of claim 1 wherein said control circuitry includes a processing unit.

5. The integrated receiver decoder of claim 1 wherein said header decoder further identifies a payload unit start indicator of the current packet.

6. The integrated receiver decoder of claim 1 wherein said header decoder further identifies the adaptation field control bits of the current packet.

7. The integrated receiver decoder of claim 1 and further comprising a demodulator coupled to said header decoder.

8. An integrated receiver decoder comprising:
   a header decoder for identifying a current packet identifier;
   an associative memory for storing stored-packet identifiers at respective addresses, said associative memory having a search mode for comparing the current packet identifier with stored-packet identifier and outputting a signal indicating the address at which the stored-packet identifier is stored;
   a random access memory for storing continuity counters associated with a previous packet for each stored-packet identifier stored in said associative memory;
   a circuit operative to use the associative memory to do said comparing the current packet identifier with the stored-packet identifiers in one clock.

9. The integrated receiver decoder of claim 8 further comprising:
   a continuity counter for a current packet; a random access memory for storing continuity counters associated with a previous packet for each stored-packet identifier stored in said associative memory; and control circuitry coupled to said associative memory and said random access memory for determining whether the current packet satisfies predetermined criteria.

* * * * *